United States Patent
Minardi et al.

(10) Patent No.: US 11,509,152 B2
(45) Date of Patent: Nov. 22, 2022

(54) BASE STATION

(71) Applicant: Datalogic IP Tech, S.r.l., Bologna (IT)

(72) Inventors: Simone Minardi, Cesena (IT); Marco Pifferi, Bologna (IT); Alessandro Giovannini, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 27 days.

(21) Appl. No.: 16/959,012

(22) PCT Filed: Dec. 29, 2017

(86) PCT No.: PCT/IT2017/000301
§ 371 (c)(1),
(2) Date: Jun. 29, 2020

(87) PCT Pub. No.: WO2019/130361
PCT Pub. Date: Jul. 4, 2019

(65) Prior Publication Data
US 2020/0335988 A1    Oct. 22, 2020

(51) Int. Cl.
*H02J 50/80* (2016.01)
*H02J 7/00* (2006.01)
(Continued)

(52) U.S. Cl.
CPC ............ *H02J 7/0044* (2013.01); *H02J 50/10* (2016.02); *H02J 50/80* (2016.02); *H04B 5/0037* (2013.01); *H04B 5/0075* (2013.01); *H04W 76/10* (2018.02)

(58) Field of Classification Search
CPC ................................ H02J 7/0044; H02J 50/80
See application file for complete search history.

(56) References Cited

U.S. PATENT DOCUMENTS

| 4,071,740 A | 1/1978 | Gogulski |
| 4,964,053 A | 10/1990 | Humble |

(Continued)

FOREIGN PATENT DOCUMENTS

| CN | 203039388 U | 7/2013 |
| CN | 204422047 U | 6/2015 |

(Continued)

OTHER PUBLICATIONS

International Preliminary Report on Patentability with Written Opinion dated Jun. 30, 2020, for International Application No. PCT/IT2017/000301, filed Dec. 29, 2017, 7 pages.

(Continued)

*Primary Examiner* — Daniel Kessie
(74) *Attorney, Agent, or Firm* — Cozen O'Connor

(57) ABSTRACT

A base station comprising: a wireless power receiver module to wirelessly receive energy from a portable device; a wireless transceiver module adapted to establish a wireless data communication with the portable device so as to wirelessly receive/transmit data; a wired interface for wired connection to an accessory device; a power distribution module coupled to the wireless power receiver module and adapted to supply the energy received from the portable device both to the accessory device, via the wired interface, and to the wireless transceiver module; a communication module coupled to the wireless transceiver module and to the wired interface, adapted to adapt data wirelessly received from the portable device, via the wireless transceiver module, into data suitable to be transmitted in a wired way to the accessory device, via the wired interface, and vice versa, to adapt data received in a wired way from the accessory device, via the wired interface, into data suitable to be transmitted wirelessly to the portable device, via the wire- (Continued)

less transceiver module; wherein the base station is passive, devoid of any internal power source.

19 Claims, 5 Drawing Sheets

(51) Int. Cl.
  *H02J 50/10* (2016.01)
  *H04W 76/10* (2018.01)
  *H04B 5/00* (2006.01)

(56) References Cited

U.S. PATENT DOCUMENTS

| | | |
|---|---|---|
| 5,083,638 A | 1/1992 | Schneider |
| 5,239,167 A | 8/1993 | Kipp |
| 5,316,107 A | 5/1994 | Wieschemann et al. |
| 7,780,081 B1 | 8/2010 | Liang |
| 9,292,853 B2 | 3/2016 | Ascarrunz et al. |
| 2010/0136918 A1 | 6/2010 | Bonner et al. |
| 2014/0376192 A1 | 12/2014 | Park et al. |
| 2016/0323435 A1* | 11/2016 | Antonopoulos .... G06F 13/4022 |
| 2018/0098366 A1* | 4/2018 | Cohn ................ H04M 1/72412 |

FOREIGN PATENT DOCUMENTS

| | | |
|---|---|---|
| CN | 204461567 U | 7/2015 |
| CN | 206369583 U | 8/2017 |
| EP | 3209004 A1 | 8/2017 |
| WO | 2012170964 A2 | 12/2012 |

OTHER PUBLICATIONS

International Search Report and Written Opinion of the International Searching Authority dated Sep. 17, 2018, issued in corresponding International Application No. PCT/IT2017/000301, filed Dec. 29, 2017, 11 pages.

* cited by examiner

BASE STATION

The present invention relates to a base station. In particular, the present invention relates to a base station that may be wirelessly powered.

Wireless powering allows a powered system or device to be provided with power without the use of wires. A wireless power transmitter system transfers energy wirelessly to a wireless power receiver system. Inductive coupling may be used to transfer electromagnetic energy between the wireless power transmitter system and the wireless power receiver system.

CN 203039388 discloses a two-way wireless charging cradle comprising a base station having a wireless receiving and transmitting unit, a control circuit board, and a power supply unit (e.g. a battery). In a transmitting mode, wireless receiving and transmitting unit wirelessly transmits power to a handheld device, the power being provided either by the internal power supply unit of the cradle or by an external power supply electrically connected (e.g. via USB connection) to the cradle. In a receiving mode, wireless receiving and transmitting unit wirelessly receives power from an external power transmitting unit and provides the received power to a handheld device electrically connected (e.g. via USB connection) to the cradle. The external power transmitting unit may be a handheld device having a wireless transmitting unit.

The Applicant faced the technical problem of providing a base station with an improved design, in particular in terms of costs and practicality of use.

The Applicant perceived that the above technical problem can be solved by using a passive base station, devoid of any internal power supply unit, capable of wirelessly receiving power from an external portable device and transmitting the wirelessly received power to an external accessory device via a wired connection, and further configured to establish high speed (e.g. multi-gigabit per second) data communication between the portable device and the external accessory device.

In a first aspect, the present invention relates to a base station comprising:
- a wireless power receiver module to wirelessly receive energy from a portable device;
- a wireless transceiver module adapted to establish a wireless data communication with the portable device so as to wirelessly receive/transmit data;
- a wired interface for wired connection to an accessory device;
- a power distribution module coupled to the wireless power receiver module and adapted to supply the energy received from the portable device both to the accessory device, via the wired interface, and to the transceiver module;
- a communication module coupled to the wireless transceiver module and to the wired interface, adapted to adapt data wirelessly received from the portable device, via the wireless transceiver module, into data suitable to be transmitted in a wired way to the accessory device, via the wired interface, and vice versa, to adapt data received in a wired way from the accessory device, via the wired interface, into data suitable to be transmitted wirelessly to the portable device, via the wireless transceiver module;

wherein the base station is passive, devoid of any internal power source.

The Applicant observes that a passive base station, devoid of any internal power source, in particular of any internal chargeable power source, advantageously enables to house complex and expensive components (e.g. battery, display, main processor, firmware, sensors, etc.) in the external portable device, thereby allowing the base station to be designed as a simple, inexpensive, little cumbersome and robust unit, in need of little maintenance, no need of firmware upgrades and capable of performing without failure and/or wearing under a wide range of conditions. The Applicant observes that these advantages are particularly important when the base stations are used under unfavorable conditions, like for example in the case of base stations arranged on shopping/warehouse cart handles, intended to be parked in a dusty industrial warehouse or in an open-air parking area wherein the base stations are exposed to the inclemency of the weather and subject to theft. Moreover, a base station having the above features advantageously provides a cost-effective and little invasive solution to interface a wireless portable device (e.g. devoid of any USB or any other physical port) with the wired interface of an accessory device. This may be useful, for example, to upgrade the functionalities of the portable device by exploiting the capabilities of the accessory device to which the portable device might be unable to be directly connected (due to the absence of a wired interface).

In a second aspect, the present invention relates to a system comprising a base station according to the first aspect of the invention and an accessory device, the accessory device having a wired interface adapted to be connected to the wired interface of the base station, and to receive the energy from the portable device and to receive/transmit data from/to the portable device via the connected base station.

In a third aspect, the present invention relates to a system comprising a base station according to the first aspect of the invention and a portable device, wherein the portable device has a wireless power transmitter/receiver module to wirelessly transmit energy to the base station and a wireless transceiver module adapted to establish data communication with the base station so as to receive/transmit data.

In a fourth aspect, the present invention relates to a system comprising a base station according to the first aspect of the invention, an accessory device, and a portable device, wherein the accessory device has a wired interface adapted to be connected to the wired interface of the base station, and to receive the energy from the portable device and to receive/transmit data from/to the portable device via the connected base station; and wherein the portable device has a wireless power transmitter/receiver module to wirelessly transmit energy to the base station and a wireless transceiver module adapted to establish data communication with the base station so as to receive/transmit data.

The present invention in at least one of the aforementioned aspects can have at least one of the following preferred characteristics.

Preferably, the base station is devoid of any power source.

The base station is a passive unit adapted to operate only when, and only as long as, wireless power is received from the portable device, or any other external device. In particular, the wireless transceiver module, the power distribution module and the communication module of the base station are adapted to operate only when, and only as long as, wireless power is received from the portable device, or any other external device.

Suitably, the wireless power receiver module is unable to wirelessly transmit energy to the portable device or any other external device.

Preferably, the base station is devoid of a processor, with related firmware, adapted to execute processor-executable instructions. Preferably, the base station is devoid of a non-volatile processor-readable storage medium which stores processor-executable instructions. Preferably, the base station is devoid of a volatile processor-readable storage medium adapted to transitory load processor-executable instructions.

Preferably, the base station comprises at least one programmable logic device like, for example, a field-programmable gate array (FPGA) or a complex programmable logic device (CPLD).

The power distribution module may be implemented by a programmable logic device like, for example, a field-programmable gate array (FPGA) or a complex programmable logic device (CPLD).

The communication module may be implemented by a programmable logic device like, for example, a field-programmable gate array (FPGA) or a complex programmable logic device (CPLD).

The wireless power receiver module preferably comprises a coil. The wireless power receiver module preferably also comprises circuitry to drive the coil. The circuitry is preferably implemented by a programmable logic device like, for example, a field-programmable gate array (FPGA) or a complex programmable logic device (CPLD).

The wireless transceiver module preferably comprises at least one antenna. The wireless transceiver module preferably also comprises circuitry to drive the at least one antenna. The circuitry is preferably implemented by a programmable logic device like, for example, a field-programmable gate array (FPGA) or a complex programmable logic device (CPLD).

The internal power source may indicate, for example, a chargeable power source like, for example, a battery or a capacitor.

Preferably, the accessory device is passive, devoid of any internal power source, in particular it is devoid of any internal chargeable power source.

Preferably, the accessory device is able to operate only when, and only as long as, it is powered from the portable device via the intermediation of the base station, or from any other external device.

Preferably, the wired interface of the base station comprises a standard interface like, for example, a USB and/or Ethernet and/or HDMI interface comprising, for example, one or more USB/Ethernet/HDMI ports or micro USB ports and/or audio jack(s).

Preferably, the data communication established by the base station between the portable device and the accessory device is a USB-like communication, or an Ethernet-like communication, or HDMI-like communication. In other words, a USB or similar connection is established between the base station and the accessory device via the wired interface of the base station. On the other side, the communication module is adapted to emulate a USB or similar connection between the base station and the portable device.

Preferably, the wireless data communication established by the wireless transceiver module is a high speed data communication having a bit rate higher than 100 Mbit/s, preferably higher than 1 Gbit/s up to 7 Gbit/s.

Preferably, the wireless data communication established by the wireless transceiver module operates over a frequency band adapted to implement high speed short-range data communication like, for example, a 60 GHz frequency band.

The wired interface of the base station is preferably adapted to establish a wired connection to a plurality of accessory devices.

The accessory device(s) may be at least one from: a scale, a localization (e.g. GPS) device, a RFID recognition device, a display, a keyboard, a printer, a beacon device, and a coded information reader.

In a preferred embodiment the accessory device is a scale.

Preferably, the scale is devoid of any internal power source, in particular it is devoid of any chargeable power source.

Suitably, the scale is able to operate only when, and only as long as, it is powered from the portable device via the intermediation of the base station, or from any other external device.

The scale is preferably configured to be mounted on a movable support like, for example, a cart (e.g. a shopping cart). In a preferred embodiment, the scale is configured to be mounted on a cart handle (e.g. shopping cart handle).

According to an alternative embodiment, the scale is preferably configured to be mounted on a fixed support like, for example, a suitable stand arranged in a predefined area of a warehouse.

The scale preferably comprises a load cell.

Preferably, the scale comprises a supporting element to support items to be weighed. More preferably, the supporting element comprises a hook or arm, for example to hang a bag (e.g. shopping bag) where placing items to be weighed.

Preferably, the portable device comprises a proximity sensor (e.g. of the magnetic type) adapted to detect the presence of the base station, when in the proximity of the portable device.

Preferably, the base station comprises a proximity sensor's target (e.g. of the magnetic type) adapted to be detected by a proximity sensor of the portable device.

Preferably, the wireless power transmitter/receiver module of the portable device is adapted to wirelessly receive energy from an external wirelessly charging device.

Preferably, the portable device comprises at least one processor adapted to execute processor-executable instructions. Preferably, the portable device comprises at least one non-volatile processor-readable storage medium which stores data and processor-executable instructions. Preferably, the portable device comprises at least one volatile processor-readable storage medium adapted to transitory load processor-executable instructions.

Preferably, said processor-executable instructions are configured so that the least one processor is adapted to understand if the base station detected by the proximity sensor is of a power-transmission type (that is, wirelessly transmitting energy) or power-reception type (that is, wirelessly receiving energy).

Preferably, if the detected base station is of a power-reception type, the at least one processor is adapted to establish a wireless power-transmission session with the detected base station and to make the wireless power transmitter/receiver module to wirelessly transmit energy to the detected base station.

Preferably, after the wireless power-transmission session has been established, the at least one processor is adapted to make the wireless transceiver module to establish a data communication session with the detected base station. Preferably, after the data communication session has been established, the at least one processor is adapted to periodically check the status of the data communication session. Preferably, if the session is inactive, the data communication session is deactivated along with the wireless power-transmission session. In this way, the base station stops to operate.

Preferably, after the data communication session has been established with the detected base station, the at least one processor is adapted to create a communication data link with the accessory device connected to the base station via the respective wired interfaces. Preferably, the at least one processor is adapted to create the communication data link with the accessory device connected to the base station by emulating a USB or similar (e.g. Ethernet or HDMI) connection between the portable device and the accessory device.

The portable device is preferably devoid of any physical wired interface like, for example, a USB interface.

Preferably, the portable device comprises a chargeable power source like, for example, a battery or capacitor.

The portable device may include various types of mobile devices, such as a mobile self-shopping device, a coded information reader, a smartphone, a tablet computer, a wearable device (e.g., watch, bracelet), a laptop computer, a notebook computer, a media player, or any other mobile device.

In the present description and claims, the expression "coded information" is used to indicate information contained in a code, preferably an optical code. The term "code" is used to indicate any graphical representation having the function of storing said coded information. The expression "optical code" comprises graphical representations, which are detectable in the field of visible light and, preferably, also in the range of wavelengths comprised between infrared and ultraviolet.

Particular examples of optical code consist of linear or two-dimensional codes, wherein the information is coded through suitable combinations of elements with a predetermined shape, for example squared, rectangular or hexagonal, of dark color (usually black) separated by clear elements (spaces, usually white), such as barcodes, stacked codes, two-dimensional codes in general, color codes, etc. The term optical code further comprises, more generally, also other graphical patterns with information coding function, including clear printed characters (letters, numbers, etc.) and special patterns (such as stamps, logos, signatures, fingerprints, etc.).

The coded information may relate, for example, to price, distance, volume, overall dimensions, and/or identification data of an object.

The coded information reader may be based on laser technology or imaging technology. In case of imaging technology, the coded information reader preferably comprises an "imager engine" o "scan engine" having a digital camera based on an image sensor like, for example, CCD (charge-coupled devices) or CMOS (complementary metal-oxide-semiconductor) sensor.

Further characteristics and advantages of the present invention will become clear from the following detailed description of some example embodiments thereof, provided just as non-limiting examples, said description being made with reference to the attached drawings, in which.

Figure 4:
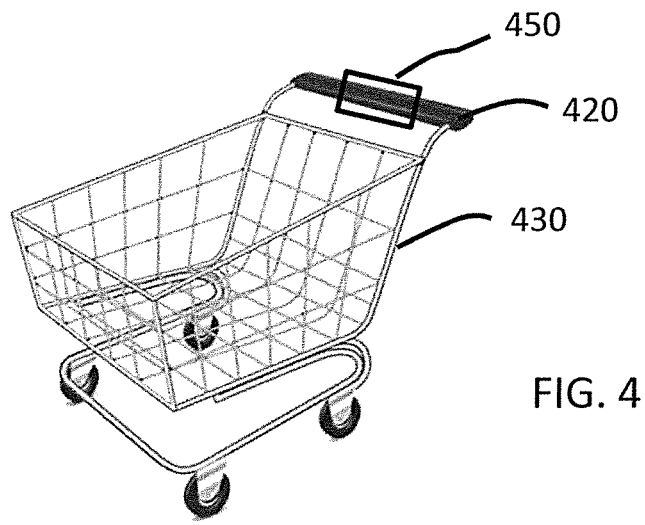
Figure 5:
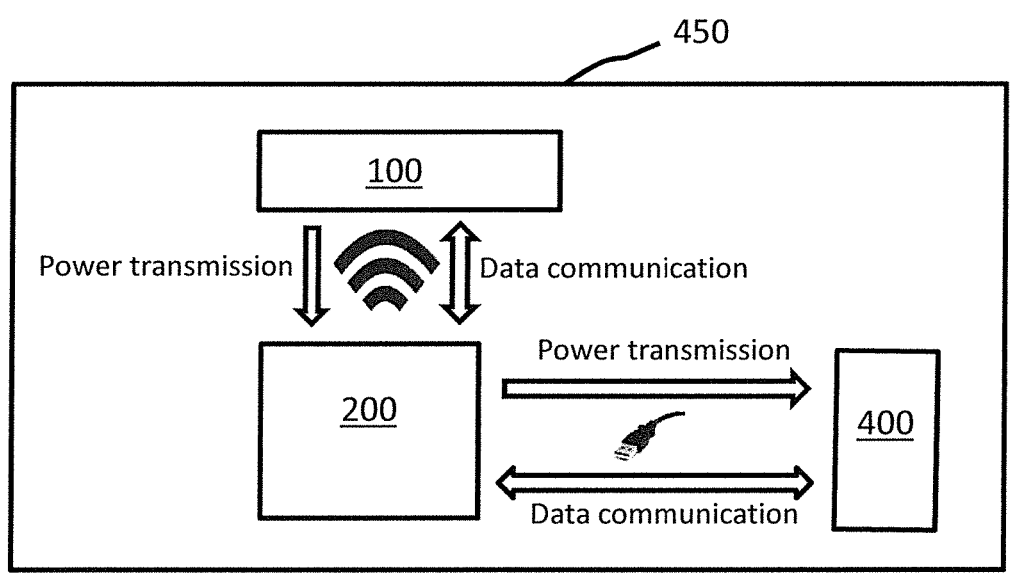
Figure 6:
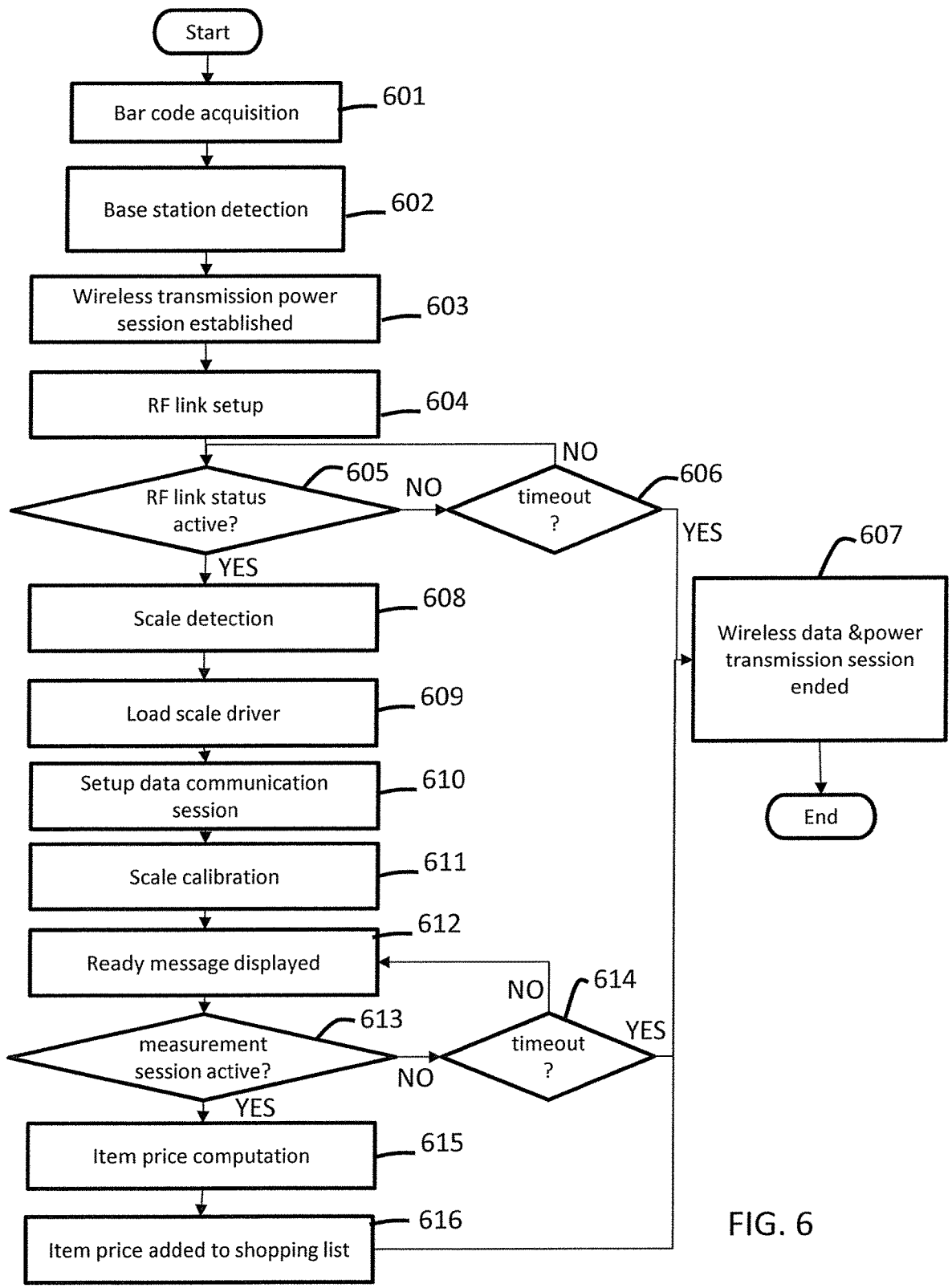

FIG. 4 schematically shows a system comprising a base station, a portable device and an accessory device, arranged on a shopping cart handle, according to an embodiment of the invention;

FIG. 5 is a block diagram schematically showing components of the system of FIG. 4;

FIG. 6 is a flow chart schematically showing an exemplarily operation of the portable device according to the embodiment of FIGS. 4-5.

Figure 1:
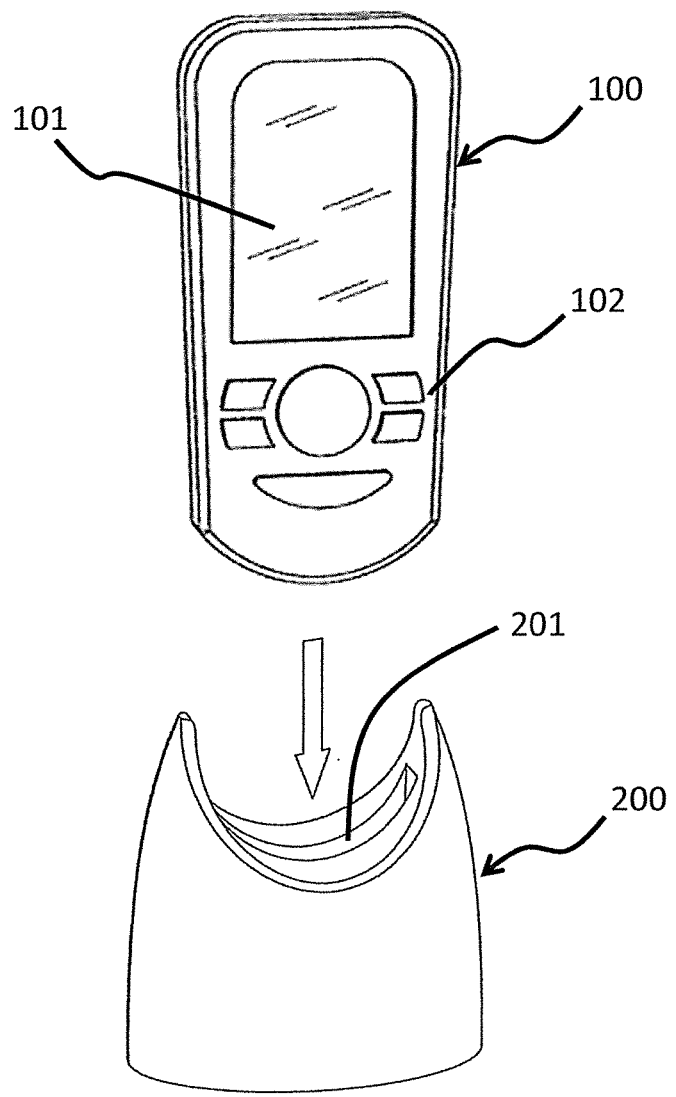
FIG. 1 shows a front perspective view of a system comprising a base station and a portable device, according to an embodiment of the invention.

FIG. 1 shows a system comprising a portable device 100 and a base station 200.

The base station 200 may be, for example, in the form of a cradle (as shown in FIG. 1) or of a substantially flat pad (example not shown in the figures).

The base station 200 comprises a seat 201 to house/support the portable device 100, wherein a user can place the portable device 100.

The portable device 100 includes a display 101 and a keyboard 102.

The portable device 100 may be a mobile self-shopping device, a coded information reader, a smartphone, a tablet computer, a wearable device (e.g., watch, bracelet), a laptop computer, a notebook computer, a media player, or any other similar mobile device.

Figure 2:
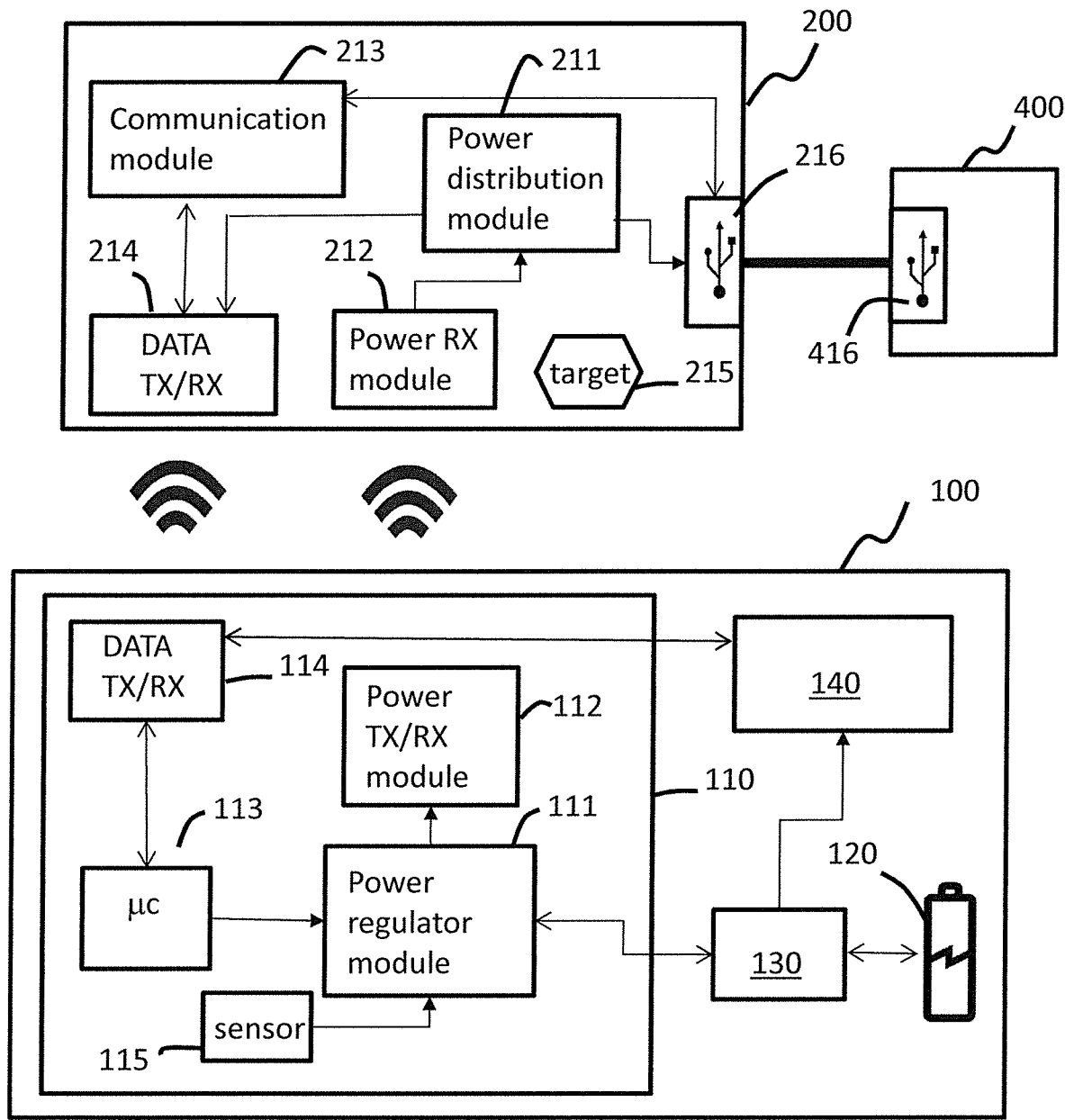
FIG. 2 is a block diagram schematically showing components of a base station and a portable device, according to an embodiment of the invention.

As schematically shown in FIG. 2, the portable device 100 comprises a base station management unit 110, a chargeable power source 120 (e.g. a rechargeable battery), a power management unit 130 and a main processor 140.

The portable device 100 may be a completely wireless device, devoid of any physical port (e.g. USB, Ethernet, HDMI) for connection to any external device and/or external power source (e.g. mains power). In alternative, the portable device 100 may comprise at least one physical port (e.g. USB, Ethernet, HDMI) for connection to any external device and/or external power source (e.g. mains power).

The base station management unit 110 comprises a wireless power transmitter/receiver module 112, a power regulator module 111, a secondary processor 113, a wireless transceiver module 114 and a proximity sensor 115.

On the other side, the base station 200 comprises a wireless power receiver module 212, a power distribution module 211, a wireless transceiver module 214, a communication module 213, a proximity sensor's target 215 and a wired interface 216.

The main processor 140 is adapted to execute processor-executable instructions to operate in general the portable device 100, according to different functionalities thereof. On the other side, the secondary processor 113 is adapted to execute processor-executable instructions to manage in particular data and power communication with the base station 200.

According to the invention, the base station 200 is devoid of any internal power source. According to the invention, the base station 200 is a passive unit in that it can only operate when, and as long as, wireless power is received from the portable device 100.

The wireless power transmitter/receiver module 112 of the portable device 100 is adapted to wirelessly transmit energy to the wireless power receiver module 212 of the base station 212. On the other side, the wireless power receiver module 212 of the base station 202 is adapted to wirelessly receive energy from the wireless power transmitter/receiver module 112 of the portable device 100.

The wireless power transmitter/receiver module 112 of the portable device 100 is also preferably adapted to wirelessly receive energy from a wireless power transmitter module of an external charging apparatus, not shown (e.g. a standard, active base station), so as to charge the chargeable power source 120.

The power may be wirelessly transmitted/received according to an inductive scheme. According to an alternative, the power may be wirelessly transmitted/received according to a magnetic resonance scheme.

In the inductive scheme, the wireless power transmitter/receiver module 112 comprises a coil (not shown) adapted to generate a magnetic field, when supplied by an AC current. The generated magnetic field induces, by electromagnetic induction, an induced current in a nearby receiving coil (not shown) of the wireless power receiver module 212.

The induced current is fed to the power distribution module 211, which is adapted to provide power to the wireless transceiver module 214 to allow it to operate, and to an external accessory device 400, which may be connected to the base station 200 via the wired interface 216 of the base station 200 itself and a wired interface 416 of the accessory device 400.

The AC current is supplied to the coil of the wireless power transmitter/receiver module 112 from the chargeable power source 120 via the power management unit 130 and the power regulator module 111. In particular, the power management unit 130 is adapted to manage the basic operations of the power source 120 (e.g. charging current, voltage, residual capacity, etc.). The power regulator module 111 is adapted to manage the transmission/reception of energy via the coil of the wireless power transmitter/receiver module 112.

The AC current may also supplied to the coil of the wireless power transmitter/receiver module 112 from an external power source (not shown).

The wireless transceiver modules 214 is adapted to operate only when, and only as long as, power is received from the wireless power transmitter/receiver module 112, via the wireless power receiver module 212 and the power distribution module 211.

The wireless transceiver modules 114, 214 are adapted to establish wireless data communication between the portable device 100 and the base station 200 so as to wirelessly receive/transmit data.

The wireless transceiver module 214 of the base station 200 is coupled to the communication module 213 of the base station 200 and, when powered via the power distribution module 211, is adapted to transmit/receive the data received/transmitted from/to the portable device 100 to/from the accessory device 400, via the wired interfaces 216, 416.

Considering that the portable device 100 and the base station 200 are adapted to exchange data in a wireless way while the base station 200 and the accessory device 400 are adapted to exchange data in a wired way, the communication module 213 is adapted to make a suitable data conversion to adapt the communication protocol used in the wireless communication into/from the communication protocol used in the wired communication.

For example, in the embodiment shown, the wired interfaces 216, 416 are USB interfaces and the wired communication is performed according to the USB communication protocol. On the other side, the wireless communication is preferably performed by emulating a USB data communication, according to technique known in the art, for example, from the Wireless Gigabit Alliance (WiGig) and by the international standard IEEE 802.11ad.

In a preferred embodiment, the data communication established between the portable device 100 and the accessory device 400 via the base station 200 is a high speed data communication having a bit rate higher than 100 Mbit/s, preferably higher than 1 Gbit/s.

Moreover, the wireless data communication established by the wireless transceiver modules 114, 214 preferably operates over a 60 GHz frequency band, as known, for example, from the Wireless Gigabit Alliance (WiGig) and by the international standard IEEE 802.11ad.

The proximity sensor 115 is adapted to detect the presence of a nearby base station 200 in cooperation with the proximity sensor's target 215 housed in the base station 200. For example, the proximity sensor 115 may be a Hall sensor and the proximity sensor's target 215 may be a suitable magnet. However, other proximity sensors known in the art may be used.

The secondary processor 113 of the base station management unit 110 of the portable device 100 is adapted to execute processor-executable instructions adapted to operate the base station management unit 110 and to manage data and power communications with the base station 200.

Figure 3:
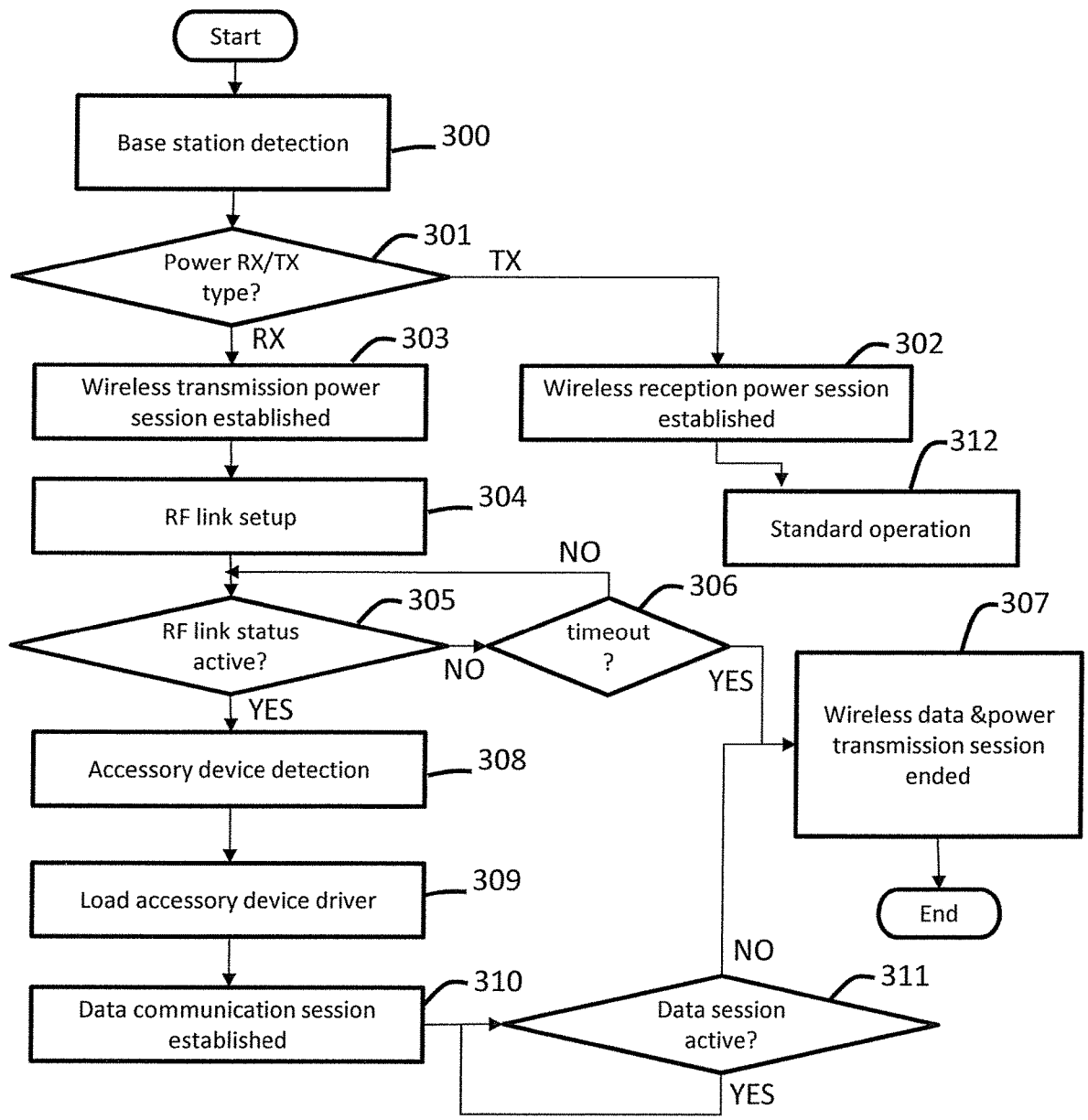
FIG. 3 is a flow chart schematically showing an exemplarily operation of a portable device according to an embodiment of the invention.

FIG. 3 schematically shows an exemplarily operation of the portable device 100.

The operation starts when the proximity sensor 115 of the portable device 100 detects the presence of a proximity sensor's target 215, that represents the presence of a base station (block 300).

At block 301 it is checked if the detected base station is of a power-transmission or power-reception type. This check may be performed, for example, by means of a ping utility. This check is useful to enable the portable device 100 to distinguish a passive base station 200 according to the invention (which is only capable of wirelessly receiving power) from another active base station, which is capable of wirelessly transmitting power.

If the detected base station is of a power-transmission type (that is an active base station), a session to wirelessly receive power from the base station 200 is established to charge the chargeable power source 120 (block 302), and the operation proceeds in a standard way (block 312), as known in the art for active base stations. Optionally a data communication session with an accessory device may be setup. The accessory device might be embedded in the active base station or connected thereto and charged by the active base station.

If the detected base station is of a power-reception type according to the disclosure of FIG. 2, the portable device 100 starts wirelessly transmitting power (e.g. 5V, 500 mA) to the base station 200 via the wireless power transmitter/receiver module 112 (block 303). On the other side, the base station 200 starts wirelessly receiving power from the portable device 100 via the wireless power receiver module 212. The latter supplies the power distribution module 211 so as to provide power to the wireless transceiver module 214, and to any external accessory device 400, via the wired interfaces 216, 416. The wireless transceiver module 214 thus starts to operate.

After block 303, the wireless transceiver modules 114 sets up a radiofrequency (RF) link with the wireless transceiver module 214 (block 304). Preferably, a 60 GHz communication channel is set up.

At this point, a check on the link status is periodically performed (block 305).

If at block 305 the link status is inactive, a timeout is checked (block 306). If at block 306 the link is in timeout, after optional multiple trials, the RF link is deactivated along with the power transmission session by stopping wireless power transmission to the base station 200 via the wireless power transmitter/receiver module 112 (block 307). If at block 306 the link is not in timeout, the link status is checked again (block 305).

If at block 305 the link status is active, an accessory device 400 connected to the base station 200 via the wired interfaces 216, 416 is detected and identified (block 308).

At this point, a driver adapted to emulate a USB connection with the identified accessory device is loaded onto the secondary processor 113 (block 309) and a data connection is established between the portable device 100 and the accessory device 400, via the base station 200 (block 310). In particular, a USB-like connection is emulated and established between the portable device 100 and the base station via the respective wireless transceiver modules 114, 214; on the other side a USB connection is established between the base station 200 and the accessory device 400 via the USB wired interfaces 216, 416. As stated above, the communication module 213 is adapted to make a suitable conversion between different (wireless/wired) communication protocols.

The data communicated to/from the portable device 100 will be suitably processed, according to different functionalities of the portable device 100, by the main processor 140, which is operatively coupled with the wireless transceiver module 114 of the portable device 100.

After the data communication session has been established, it is periodically checked the status of the data communication session (block 311).

If at block 311 the session is inactive, the RF link is deactivated along with the power transmission session by stopping wireless power transmission to the base station 200 via the wireless power transmitter/receiver module 112 (block 307).

If at block 311 the session is active, the status of the data communication session is checked again (block 311).

As it will be clear from the above description, the base station 200 according to the invention is a passive unit, devoid of any internal power source and capable of operating only when, and only as long as, it is wirelessly powered by the portable device 100. The smart part of the system portable device-base station is represented by the portable device 100, while the passive base station 200 just comprises the electronic components necessary to perform wireless power reception and wireless/wired data communication functionalities. These functionalities may be implemented by programmable logic devices without the need of any "smart" processor with related firmware. In this way, the base station 200 needs very little maintenance with no need of firmware upgrade.

Moreover, the base station 200 can be designed as a simple, inexpensive and robust unit, capable of performing without failure and/or wearing under a wide range of conditions.

In addition, for a completely wireless portable device 100, devoid of any wired interface (e.g. devoid of any USB or any other physical port), the base station 200 provides a cost-effective solution to interface the completely wireless portable device 100 with the wired interface 416 of an accessory device 400. Thanks to the communication module 213, the base station enables to establish a high-speed data link, emulating a wired (e.g. USB) connection, between the portable device 100 and the accessory device 400.

The connection to the accessory device 400 can be advantageously used to upgrade the functionalities of the portable device 100 without any need of direct reconfiguration of the portable device 100.

For example, the portable device 100 may be upgraded with a RFID item recognition functionality, when a passive RFID module is attached, as accessory device 400, to the base station 200. Once the portable device 100 is wirelessly connected to the base station 200, it is enabled—via the accessory device 400 connected to the base station 200—to read RFID tag on multiple objects and to have the acquired data suitably processed by the main processor 140 of the portable device 100.

As another example, the portable device 100 may be upgraded with a GPS localization functionality by attaching, as accessory device 400, a GPS localization passive module to the base station 200. In this manner the portable device 100 can be easily localized, when wirelessly connected to the base station 200, when positioned, for example, on a vehicle, a forklift or in a specific position inside a facility.

As another example, the portable device 100 may be upgraded by attaching a handheld barcode reader, as accessory device 400, to the base station 200. This can be very useful in case the portable device 100 is devoid of a scan engine or if the performances of the scan engine embedded in the portable device 100 are limited (the handheld barcode reader could have additional OCR capabilities, long range of reading distances, etc.).

As a further example, the portable device 100 may be upgraded by attaching a scale, as accessory device 400, to the base station 200.

In this case the base station 200 may, for example, be arranged on a shopping cart of a supermarket and the portable device 100 may be in the form of a mobile self-shopping device including a coded information reader. The self-shopping device may facilitate purchase in the supermarket where a customer collects the desired products from shelves and reads a product code from each product via the coded information reader included in the mobile self-shopping device, to obtain product data typically including the price. The product data may be stored in a list. At the end of shopping, the cash slip and the payment may be made based on the stored list.

The scale attached to the base station 200 as accessory device 400 enables each user to have at his disposal his own scale to weight items (e.g. fresh fruit and vegetables or in general bulk merchandise) in order to obtain the total cost of the merchandise. This approach is advantageous with respect to a standard solution wherein multiple fixed scales are normally used and shared between users. Indeed, the standard approach could present some disadvantages like possible lines for the scale use, waste of paper for printing the labels of weighted items, need of maintenance for the scale, and bad effects on multiple users in case of malfunctioning of one scale.

FIGS. 4 and 5 show an embodiment wherein a system 450, comprising the base station 200, the scale as accessory device 400, and the portable device 100, is suitably arranged on a handle 420 of a shopping cart 430. The scale may comprise, for example, a hook or arm (not shown) where the user can hang a shopping bag where he can place the items to be weighed. The scale may comprise, for example, a further hook (not shown) to be hung on the handle 420. The scale is a passive device, devoid of any internal power source. Preferably, the scale is devoid of any display and keyboard (which are present in the portable device 100).

The scale may comprise a load cell. For example, a load cell suitable for this application is a JR S-Beam Load Cell (LSB200) from FUTEK Advanced Sensor Technology, Inc.

Multiple models with a large number of different full-scale values are available in the market, fitting the needs of multiple application (from 10 g model to 100 lb model). The excitation voltage of a load cell generally varies from 1V to 10V, values that fit well with the output voltage that may be provided by the base station 200 powered by the portable device 100.

As described above, once the scale 400 is connected to the base station 200 via the wired interfaces 216, 416 and the portable device 100 is wirelessly connected to the base station 200, the scale is powered by the portable device 100 and enabled to exchange data (the weight of the items) with it, via the intermediation of the base station 200.

While shopping, a user handling the portable device 100 may collect the items to be weighed in a shopping bag, scan the specific barcode of the items to be weighed by using the coded information reader embedded in the portable device 100, and place the portable device 100 on the base station 200 arranged on the handle 420 of the shopping cart 430 (or, in any case, wirelessly connect it to the base station 200). In this way, as described above, the portable device 100 connects to the base station 200 and the scale 400, and powers them up. The user can thus hang the shopping bag with the items to be weighed on the hook or arm of the scale 400. The weight of the items is collected by the scale 400 and sent to the portable terminal 100 via the intermediation of the base station 200. The terminal 100 is thus enabled (through the main processor 140) to calculate the total cost of the weighed items and to add it to the shopping list.

In the measurement session, the weight value acquired by the scale 400 can be read from the portable device 100 as analog value or in a USB-like connection as a 16 bit digitalized value.

In a possible implementation, after scanning the barcode of the item to purchase, the user may hang the empty shopping bag on the hook or arm of the scale so as to progressively add the items in the shopping bag. In this way, the portable device 100 may display in real time the weight and the cost of the items, in order to let the user decide to increase or decrease the amount of goods to purchase. This mode of use, which is very interesting for the user, would be annoying in a standard solution using a fixed scale.

According to an alternative embodiment (not shown), the system 450 may be arranged elsewhere like, for example, in a specific area of the supermarket or in a warehouse, replacing a conventional scale but reducing costs and spaces and allowing more units to be installed in case of queue problem for weight measurement.

FIG. 6 schematically shows an exemplarily operation of the portable device 100 for the embodiment described above with reference to FIGS. 4-5, wherein the accessory device 400 is a scale.

At block 601, the portable device 100, handled by a user, acquires the barcode of an item.

At block 602, the portable device 100, placed in proximity of the base station 200, senses the presence of the base station 200, by means of the proximity sensor 115.

At block 603, the portable device 100 starts to wirelessly transmit power to the base station 200 (e.g. 5V, 500 mA). On the other side, the base station 200 starts providing power to the scale 400, via the wired interfaces 216, 416. Even if not shown, blocks similar to blocks 301-302 and 312 of FIG. 3 are preferably provided.

At block 604, the portable device 100 sets up a radiofrequency (RF) link with the base station 200. Preferably, a 60 GHz communication channel is set up.

At block 605, a check on the link status is performed.

If at block 605 the link status is inactive, a timeout is checked (block 606). If at block 606 the link is in timeout, after optional multiple trials, the RF link is deactivated along with the power transmission session by stopping wireless power transmission to the base station 200 (block 607). If at block 606 the link is not in timeout, the link status is checked again (block 605)

If at block 605 the link status is active, the scale 400 connected to the base station 200 via the wired interfaces 216, 416 is detected and identified (block 608).

At block 609, a driver adapted to emulate a USB connection with the identified scale 400 is loaded onto the secondary processor 113 of the portable device 100 and at block 610 a data connection is established between the portable device 100 and the accessory device 400, via the base station 200 (block 610).

At block 611 an optional calibration operation of the scale 400 is preferably performed.

At block 612, the portable device 100 displays a "ready message" to the user on the display 101.

At block 613, a check on the measurement session status is performed.

If at block 613 the measurement session status is inactive, a timeout is checked (block 614). If at block 614 the measurement session is in timeout, after optional multiple trials, the RF link is deactivated along with the power transmission session by stopping wireless power transmission to the base station 200 (block 607). If at block 614 the measurement session is not in timeout, the "ready message" is displayed (block 612)

If at block 613 the measurement session status is active, the item price is computed (block 615).

At block 616 the total cost of the weighed items is added (preferably under user approval) to the shopping list.

At this point, the RF link is deactivated along with the power transmission session by stopping wireless power transmission to the base station 200 (block 607).

As it will be clear from the above description, the invention enables to provide a very cost-effective scale system, wherein the scale can be made as a very simple, low cost, passive device, without any battery, display, processor or memory (as the main functions can be implemented by programmable logic devices), that can be powered by a wireless portable device 100, thanks to the intermediation of the base station 200. This make the system base station-scale little invasive and cumbersome, very robust, and with no need of firmware upgrades. Such assemblies can thus be arranged on shopping/warehouse cart handles, without upsetting the shopping/warehouse cart system, and with little need of maintenance and little risk of failure and/or wearing, even when the shopping/warehouse carts are intended to be parked in a dusty industrial warehouse or in an open-air parking area, wherein the assemblies base station-scale may be exposed to the inclemency of the weather and subject to theft.

The invention claimed is:

1. A base station comprising:
   a wireless power receiver module to wirelessly receive energy from a portable device;
   a wireless transceiver module operable to establish a wireless data communication with the portable device so as to wirelessly receive/transmit data;
   a wired interface for wired connection to an accessory device;
   a power distribution module coupled to the wireless power receiver module, the power distribution module coupled to both the wired interface and the wireless transceiver module to supply the energy received from the portable device both to the accessory device, via the wired interface, and to the wireless transceiver module, wherein the base station is devoid of a path from the wireless power receiver module to the wired interface that does not pass through the power distribution module; and a communication module coupled to the wireless transceiver module and to the wired interface thereby forming a path from the wireless transceiver module to the wired interface that does not intersect the power distribution module, which in operation adapts data wirelessly received from the portable device, via the wireless transceiver module, into data suitable to be transmitted in a wired way to the accessory device, via the wired interface, and vice versa, to adapt data received in a wired way from the accessory device, via the wired interface, into data suitable to be transmitted wirelessly to the portable device, via the wireless transceiver module;

wherein the base station is passive, devoid of any internal power source.

2. The base station according to claim 1, wherein the wired interface comprises a USB or Ethernet or HDMI interface.

3. The base station according to claim 1, wherein the communication module is adapted to emulate a USB or Ethernet or HDMI data connection between the base station and the portable device.

4. The base station according to claim 1, wherein the wireless data communication established by the wireless transceiver module operates over a 60 GHz frequency band.

5. The base station according to claim 1, wherein the wireless data communication established by the wireless transceiver module is a high speed data communication having a bit rate higher than 100 Mbit/s, preferably higher than 1 Gbit/s.

6. The base station according to claim 1, further comprising a proximity sensor's target adapted to be detected by a proximity sensor of the portable device.

7. A system comprising:
an accessory device, and
a base station comprising:
  a wireless power receiver module to wirelessly receive energy from a portable device;
  a wireless transceiver module operable to establish a wireless data communication with the portable device so as to wirelessly receive/transmit data;
  a wired interface for wired connection to an accessory device;
  a power distribution module coupled to the wireless power receiver module and coupled to the wired interface thereby forming a first path to supply the energy received from the portable device to the accessory device, via the wired interface, and coupled to the wireless transceiver module; and
  a communication module coupled to the wireless transceiver module and to the wired interface thereby forming a second path that does not intersect the power distribution module, wherein the communication module in operation adapts data wirelessly received from the portable device, via the wireless transceiver module, into data suitable to be transmitted in a wired way via the second path, separate from the first path, to the accessory device, via the wired interface, and vice versa, to adapt data received in a wired way from the accessory device, via the wired interface, into data suitable to be transmitted wirelessly to the portable device, via the wireless transceiver module; and the base station is passive, devoid of any internal power source, wherein the accessory device has a wired interface adapted to be connected to the wired interface of the base station, and to receive the energy from the portable device and to receive/transmit data from/to the portable device via the base station.

8. The system according to claim 7, wherein the accessory device is passive, devoid of any internal power source.

9. The system according to claim 7, wherein the accessory device is selected from the group comprising: a scale, a localization device, a keyboard, a printer, a display, a beacon device, a RFID recognition device, and a coded information reader.

10. The system according to claim 9, wherein the scale comprises a load cell.

11. The system according to claim 9, wherein the scale comprises a supporting element to support items to be weighed.

12. A system comprising:
a base station comprising:
  a wireless power receiver module, a wired interface, and a power distribution module coupled to both the wireless power receiver module and the wired interface, wherein the base station is devoid of a path from the wireless power receiver module to the wired interface that does not pass through the power distribution module; and
  a wireless transceiver module and a communication module, the communication module coupled to both the wireless transceiver module and to the wired interface thereby forming a path from the wireless transceiver module to the wired interface that does not intersect the power distribution module; and
a portable device, wherein the portable device has a wireless power transmitter/receiver module to wirelessly transmit energy to the base station and a wireless transceiver module adapted to establish data communication with the base station so as to receive/transmit data from/to an accessory device connected to the wired interface of the base station, and wherein the base station is a passive unit adapted to be operable only when and only as long as, wireless power is received from the portable device.

13. The system according to claim 12, wherein the portable device comprises a proximity sensor adapted to detect the presence of the base station, when in the proximity of the portable device.

14. The system according to claim 13, wherein the at least one processor is adapted to check if the base station detected by the proximity sensor is of a power-transmission or power-reception type.

15. The system according to claim 14, wherein, if the detected base station is of a power-reception type, the at least one processor is adapted to establish a wireless power-transmission session with the detected base station and to make the wireless power transmitter/receiver module to wirelessly transmit energy to the wireless power receiver module of the detected base station.

16. The system according to claim 15, wherein, after the wireless power-transmission session has been established, the at least one processor is adapted to make the wireless transceiver module of the portable device to establish a wireless data communication session with the wireless transceiver module of the detected base station.

17. The system according to claim 16, wherein, after the wireless data communication session has been established, the at least one processor is adapted to periodically check the status of the wireless data communication session.

18. The system according to claim 17, wherein, if the status of the wireless data communication session is inactive, the wireless data communication session is deactivated along with the wireless power-transmission session.

19. The system according to claim 18, wherein the portable device is devoid of any physical wired interface.

\* \* \* \* \*